United States Patent Office 3,424,684
Patented Jan. 28, 1969

3,424,684
LUBRICANT CONTAINING POLYMERIC PRODUCT OF ALKENYL SUCCINIC ANHYDRIDE AND HYDROXY CONTAINING PIPERAZINE DERIVATIVE
Walter W. Hellmuth, Beacon, N.Y., assignor to Texaco Inc., New York, N.Y., a corporation of Delaware
No Drawing. Filed Mar. 10, 1967, Ser. No. 622,087
U.S. Cl. 252—51.5  8 Claims
Int. Cl. C10m 3/08

ABSTRACT OF THE DISCLOSURE

A lubricating composition containing as a dispersant between about 0.1 and 80 wt. percent of a polymeric alkenyl succinic anhydride-alkoxylated piperazine selected from the group consisting of

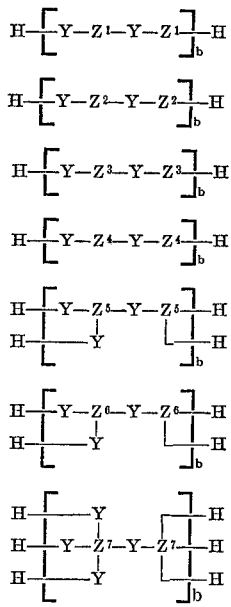

where

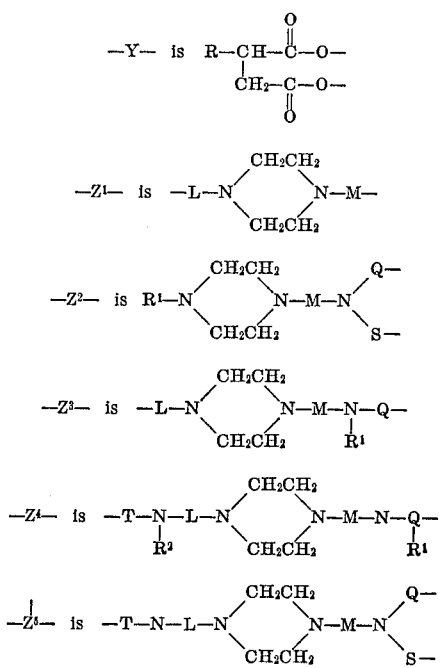

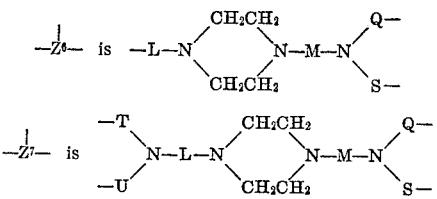

and where $b$ is an average integer between about 1 and 100, R is a monovalent alkenyl hydrocarbon radical of from 30 to 200 carbons, $R^1$ and $R^2$ are monovalent saturated aliphatic hydrocarbon radicals (alkyl) or monohydroxyalkyl radicals of from 1 to 10 carbons, and L, M, Q, S, T and U are divalent saturated aliphatic hydrocarbons (alkanediyls) of from 2 to 10 carbons.

The polymer is prepared by reacting under substantially anhydrous conditions alkenyl succinic anhydride with an alkoxylated piperazine in a ratio of acyl groups to hydroxyl groups of between 1:1 and 1:2 at a temperature between about 80 and 220° C. while continuously removing water as formed.

BACKGROUND OF THE INVENTION

Field of the invention

The field of art to which this invention pertains are fluid compositions designed for use between two relatively moving surfaces in contact therewith or reducing friction therebetween containing a polymeric additive which also contains oxygen in addition to carbon, hydrogen and nitrogen, said additive functioning as a dispersant.

Description of the prior art

The prior art as represented by U.S. 3,184,474 teaches as a sludge dispersant for lubricating oil a reaction product of an alkenyl succinic acid or anhydride with a polyamine and polyhydric material. The prior art product is prepared by a two step procedure by which a polyhydric material such as a polyethylene glycol and a polyalkylene polyamine such as tetraethylenepentamine are sequentially reacted with the alkenyl succinic anhydride. The resultant product is nonpolymeric mixture of ester, amide and imide. The patent further discloses as a dispersant the alkenyl succinimides of polyalkylene polyamines such as tetraethylenepentamine. While these prior art dispersants perform satisfactorily they do have the disadvantage particularly the amide and imide forms of breaking down during storage and use to give off an offensive ammonia odor. Further, although these additives are often satisfactory under lubricating conditions a search is continuously underway for additives of improved dispersancy properties especially to meet the heavy demands placed on the modern day lubricating oils in automative engines, e.g., by antiair pollution devices.

SUMMARY OF THE INVENTION

I have discovered a lubricating composition containing a polymeric alkenyl succinic anhydride-alkoxylated piperazine selected from the group consisting of

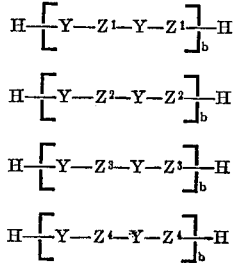

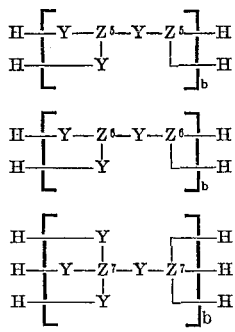

where

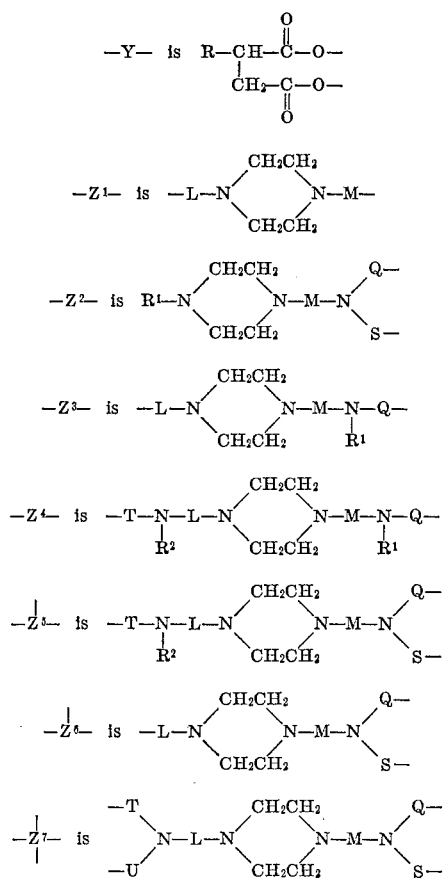

and where *b* is an average integer between about 1 and 100, R is a monovalent alkenyl hydrocarbon radical of from 20 to 200 carbons, $R^1$ and $R^2$ are monovalent saturated aliphatic hydrocarbon radicals (alkyl) or monohydroxyalkyl radicals of from 1 to 10 carbons, and L, M, Q, S, T and U are divalent saturated aliphatic hydrocarbons (alkanediyls) of from 2 to 10 carbons.

The polymeric compound in the novel lubricant composition of the invention imparts to the novel composition dispersing properties substantially superior to many of the analogous materials in the prior art in respect to prevent the deposition of sludge on the engine parts of an automotive engine exposed to the lubricant composition. Further, the polymeric additive in the novel compositions of the invention do not emit an unpleasant ammonia odor upon standing or upon engine use which is not the case of many related prior art amides and imides.

DETAILED DESCRIPTION OF THE INVENTION

Specifically, the invention pertains to a hydrocarbon lubricating composition containing between about 0.1 and 80 wt. percent of a polymeric derivative of alkenyl succinic anhydride of the formula:

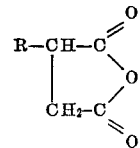

where R is as heretofore defined and an alkoxylated piperazine selected from the group consisting of

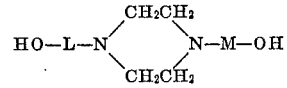

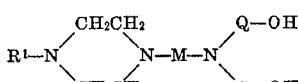

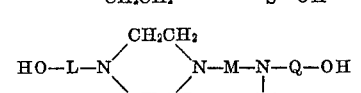

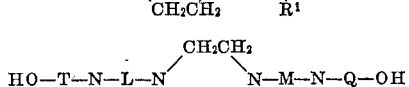

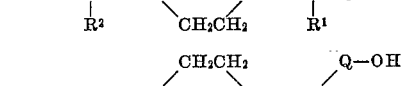

and

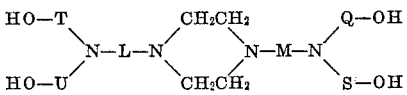

where $R^1$, $R^2$, L, M, Q, S, T and U are as heretofore defined.

The polymeric additive of the composition of the invention is prepared by contacting under substantially anhydrous conditions alkenyl succinic anhydride as defined with alkoxylated piperazine as defined desirably in the presence of a hydrocarbon lubricating oil at a temperature between about 80 and 220° C. and under conditions in which water is removed from the reaction mixture as formed. The contacting is conducted utilizing a ratio of reactant ingredient amounts which results in a ratio of acyl to hydroxyl groups in the initial reaction mixture of between about 1:1 and 1:2. In the reaction mixture the hydrocarbon lubricating oil component advantageously comprises between about 15 and 70 wt. percent. Under preferred conditions an azeotroping agent for water is also included to facilitate the continuous removal of water as formed. The azeotroping agent advantageously comprises between about 1 and 50 wt. percent of the reaction mixture. In any case, the continuous removal of formed water is accomplished by standard means with or without the use of azeotroping agent. Example standard means include straight distillation at the reaction temperature utilizing reduced pressure when necessary with or without a simultaneous stripping of the reaction mixture by passing an inert gas therethrough. An example of a particularly suitable inert gas is nitrogen. The reaction is usually conducted for a period of time between about 2 and 24 hours whereupon the temperature is preferably further elevated, e.g., to between about 140 and 220° C. to remove any residual water and volatile materials such as azetroping agent (if employed). There is left as residue the polymeric dispersant as heretofore defined or a hydrocarbon lubricating oil concentrate thereof if hydrocarbon lubricating oil is employed as the reaction medium. The hydrocarbon lubricating oil concentrate residue normally containing between about 20 and 75 wt. percent polymeric dispersant. Although the concentrate with these relatively high quantities the polymeric additive will still function as a satisfactory dispersant, it is normally diluted with additional hydrocarbon lubricating oil to form a finished lubricating oil composition having a polymeric additive content of between about 0.1 and 10 wt. percent. Also in the finished lubricating oil, additional additives may be incorporated such as standard antioxidants, VI improvers, pour depressors and other dispersants. The particular additive combination employed will, of course, be determined by the particular use designated for the finished composition.

In the manufacture of the polymeric additive there are several criticalities. One criticality is forming substantially anhydrous initial reaction mixture and continuously removing water as formed. The reason for this is if the continued presence of water is permitted during the reaction a nonpolymeric alkoxylated piperazine monoester and diester of alkenyl succinic anhydride tend to predominate in the product. The mono- and diesters are substantially less effective dispersants than their polymeric counterparts in the compositions of the invention. The mono- and diesters may be characterized by the formula utilizing $Z^1$ as the piperazine moiety:

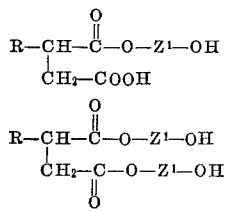

where $Z^1$ and R are as heretofore defined.

A second procedural criticality is the forming of an initial reaction mixture wherein the quantities of alkenyl succinic anhydride and alkoxylated piperazine are adjusted so as to give an acyl group (from anhydride) to hydroxyl group (from alkoxylated piperazine) of between about 1:1 and 1:2. When acyl to hydroxyl ratios greater than about 1:1 are employed, carboxylate salts are formed which have substantially less dispersant effectiveness in lubricating oils than the polymeric derivatives in the compositions of the invention. Further, when acyl to hydroxyl ratios of less than about 1:2 are employed in the initial reaction mixture the aforementioned less desirable mono- or diester are formed.

Although not necessary, standard esterification-polymerization catalysts may be employed in the preparation of the polymeric derivatives in amounts of between about .0001 and 2.0 wt. percent of the reaction mixture. Specific examples of suitable esterification-polymerization catalysts contemplated herein are lead oxide, p-toluene sulfonic acid, and sulfuric acid.

As heretofore stated the alkenyl succinic anhydride reactant contemplated herein is of the formula:

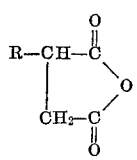

where R is an alkenyl hydrocarbon radical containing from 30 to about 200 carbon atoms.

For the purpose of the present invention, alkenyl succinic acid of the formula:

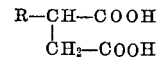

is deemed equivalent to the aforedefined alkenyl succinic anhydride.

The R radical in the above formulas is normally derived from an alkene containing 2 to 5 carbons. Thus, the alkenyl radical is derived from a polyolefinic hydrocarbon of from 30 to 200 carbons obtained by polymerizing by standard means an alkene containing 2 to 5 carbons. The alkene precursors are exemplified by ethylene, propylene, 1-butene, 2-butene, isobutene and mixtures thereof.

The alkenyl succinic anhydrides are prepared by reacting the aforedescribed polyolefins with maleic anhydride in a mole ratio of between about 1:0.5 and 1:10, preferably from 1:0.8 to 1:5. The reaction temperature can vary from 177 to 232° C. Hydrolysis of the anhydride with water results in the equivalent alkenyl succinic acid reactant.

One of the preferred olefin polymers in the preparation of the alkenyl succinic anhydride is polyisobutene of a molecular weight between about 1,000 and 2,000. In the preparation of the succinic anhydride if hydrocarbon lubricating oil is used as the diluent it becomes part of the succinic anhydride product and part of the final lubricant composition of the invention.

As heretofore described the alkoxylated piperazine reactant is normally prepared by the reaction (adduction) of alkylene oxide such as ethylene oxide, propylene oxide or butylene oxide with a piperazine compound such as piperazine, 2'-aminoethyl piperazine, N,N-di(2-aminoethyl)piperazine and 2'-N-methylaminoethyl piperazine. The alkoxylation is normally conducted at a temperature between about 0 and 50° C, utilizing a mole ratio between about 1:1 and 10:1 oxide to amine compound.

Specific examples of alkoxylated piperazine reactant contemplated herein are as follows:

(a) 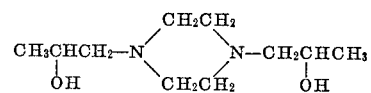

(b) 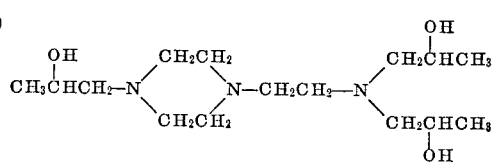

(c) 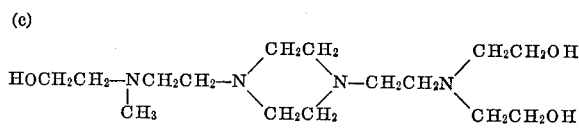

(d) 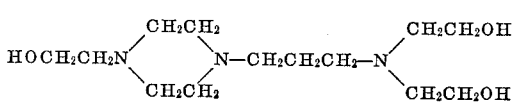

(e), (f) 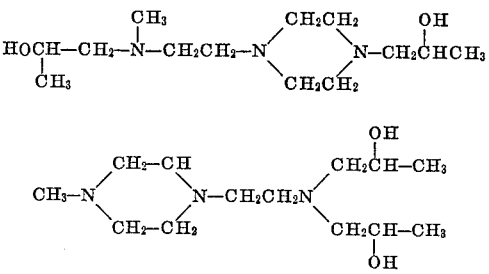

(g) 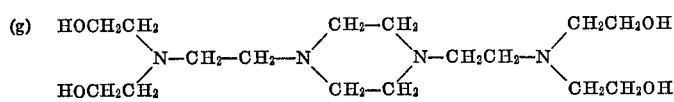

(h) 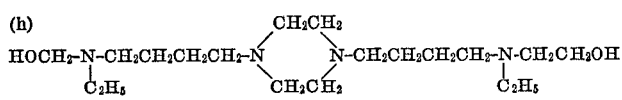

The hydrocarbon lubricating oils contemplated herein for the base oil for the concentrate and finished compositions of the invention as well as the reaction medium (if used) in the preparation of the polymeric dispersant can be any of the hydrocarbon oils having lubricating viscosity, e.g., between about 45 and 8,000 SUS at 100° F. Specific examples are the paraffinic, naphthenic and aromatic base mineral lubricating oils derived from solvent refining crude petroleum products. In addition, synthetic hydrocarbon oils may be employed such as the liquid polyalkenes, e.g., polyisobutylene, polyisopropylene of a molecular weight between about 250 and 750 and alkylated benzene, e.g., dodecyl benzene. Preferred base oils are the mineral lubricating oils having an SUS viscosity between about 45 and 8,000 at 100° F. for the preparation of the finished lubricant, whereas in the manufacture of the lubricating oil concentrate the lube oil is most suitably the polyolefin, if of lubricating oil viscosity, derived from the use of an excess of polyolefin in the manufacture of the alkenyl succinic anhydride reactant.

In regard to the azeotroping agent, any liquid agent is suitable which will form an azeotrope with water and readily distill from the reaction mixture under the contemplated reaction temperature. Specific examples of suitable azeotroping agents are the aromatic and alkylated aromatic liquid hydrocarbons such as toluene, benzene and xylene having a boiling point between about 80 and 200° C.

The following examples further illustrate the invention but are to be construed as limitations thereof.

EXAMPLE I

To a 12 liter glass reactor fitted with a reflux condenser, gas inlet and outlet tube, thermometer and stirrer, there is charged 2,000 grams of polyisobutene (1,200 M.W.) succinic anhydride, 2,550 grams of polyisobutene of 1,200 M.W. (associated with said succinic anhydride), and 506 grams tripropoxylated 2'-aminoethyl piperazine of the formula:

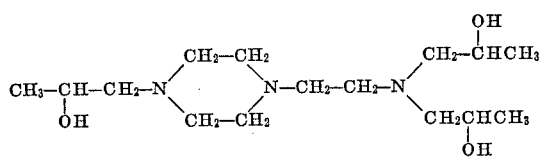

and 600 mls. toluene giving an acyl to hydroxyl ratio of 1:1. The reaction mixture is heated to a temperature of 175° C. under reflux conditions while continuously maintaining a stream of nitrogen therethrough (300 mls./minute) to facilitate the continuous removal of formed water-toluene azeotrope. At the end of the 5 hour period the reflux is terminated and the temperature is raised to about 180° C. for a period of 2 hours resulting in the removal of toluene and any residual water leaving polyisobutylene oil concentrate containing 60 wt. percent of a polymerized additive of polyisobutene succinic anhydride and tripropoxylated aminoethyl piperazine characterized by the formula:

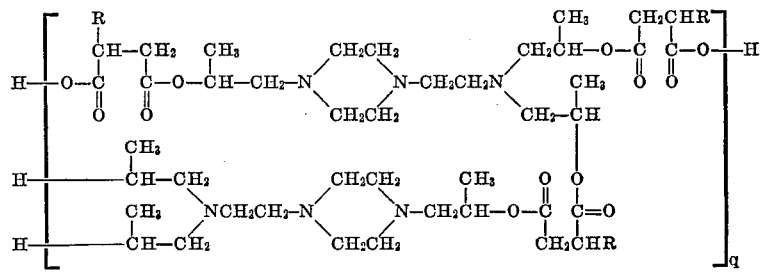

where R is polyisobutene radical of a molecular weight about 1,200 and $q$ is an average integer of about 2.

The foregoing polymerized product is diluted with 5,811 grams diluent mineral oil, filtered and the resultant filtrate composition has a total acid number of 2.02 (0 calc.), hydroxyl number of 4 (0 calc.), a nitrogen content of 0.52 wt. percent (0.58 calc.), a kinematic viscosity at 210° F. of 92.6 cs. and a very strong ester band reading in the infrared spectrograph analysis.

EXAMPLE II

This example further illustrates the preparation of the lubricating oil concentrate of the invention.

To a reactor of the type described in Example I there is charged 1200 grams of polyisobutene (1200 M.W.) succinic anhyride, 1000 grams polyisobutene (associated with the succinic anhydride reactant), 202 grams of N,N'-di(2-hydroxypropyl) piperazine and 600 mls. of toluene and 0.1 gram of an alkylated benzene sulfonic acid. Throughout the entire reaction nitrogen is passed through the reaction mixture. The reaction mixture is heated and maintained at a temperature of about 150° C. under reflux conditions for a period of 20 hours, the reflux being adjusted so that the toluene water azeotrope is continuously removed as overhead as formed. At the end of the 20 hour period the reflux terminated and the temperature is raised to about 180° C. taking toluene and residual water off as overhead and leaving as residue a polyisobutene oil concentrate containing about 59 wt. percent of a polymeric additive of polyisobutene (1,200 M.W.) succinic anhydride and N,N'-di(2-hydroxypropyl) piperazine of the formula:

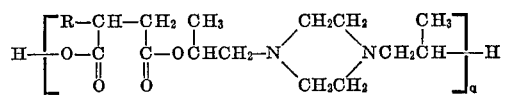

where $q$ is an average integer of about 5 and R is a polyisobutene radical of about 1,200 molecular weight.

The foregoing polymer concentrate is diluted with 2436 grams mineral oil to give a product having a total acid number of 0.7 (0 calc.), a neutralization number (KOH) of 0.35 (0 calc.), a nitrogen content of 0.56 wt. percent (0.58 calc.), and a strong ester carbonyl characterization in the infrared spectra analysis.

EXAMPLE III

This example illustrates the lubricant compositions of the invention and their dispersant properties.

A sludge test is employed to determine the relative dispersant effectiveness of the lubricating oil composition. The test comprises placing in a weighing bottle the lubricating oil composition to be tested, a dispersion of resin coated titanium oxide in naphthenic base oil, hydrocarbon blowby from a combustion engine and cetane. The weighing bottle is then capped and placed in a rocking device in an oven and rocked for 20 hrs. at about 80° C. At the end of the 20 hour period a sample of the bottle contents is immediately transferred to a centrifuge tube. The tube is then centrifuged. The depth of sediment in the bottom of the centrifuged tube is measured in millimeters. The greater the depth of sediment the poorer the dispersant properties of the test oil.

The polymeric additive concentrate of the type prepared in Example I is tested in various concentrations in a paraffinic base petroleum lubricating oil of an SUS viscosity at 100° F. of about 340 in the aforedescribed bench sludge test. The test results are reported below in Table I:

TABLE I

| Run | Polymer additive, wt. percent | Sediment depth, mm. |
|---|---|---|
| Control | 0 | 2.9 |
| AA | 4 | 2.2 |
| BB | 6 | 1.1 |
| CC | 8 | 0.6 |

EXAMPLE IV

This example illustrates the superiority in respect to dispersancy of the compositions of the invention over analogous compositions.

The compositions of the invention and the comparative compositions are tested in the bench sludge test described in Example III.

The compositions tested are as follows:

(1) Composition DD consists of a paraffinic base lubricating oil of an SUS viscosity of 340 at 100° F. containing 2.7 wt. percent of a polymeric additive concentrate of the type prepared in Example I blended to give 0.027 wt. percent N in Composition DD.

(2) Composition EE consists of a paraffinic base lubricating oil of an SUS viscosity at 100° F. of 340 containing 3.6 wt. percent of the polymeric additive concentrate (0.040 wt. percent N in the final blend EE) of the type prepared in Example I except in the preparation of said additive concentrate the acyl to hydroxyl ratio in the initial reaction mixture in the preparation of the polymeric additive was 2:3 (1:1.5).

(3) Composition FF consists of paraffinic petroleum base lubricating oil of an SUS viscosity at 100° F. of 340 containing 3.6 wt. percent of an additive concentrate having a dispersant consisting primarily of $$R-CH-\overset{O}{\overset{\|}{C}}-O-\overset{CH_3}{\overset{|}{C}H}-CH_2N\overset{CH_2-CH_2}{\underset{CH_2-CH_2}{<}}N-CH_2CH_2N\overset{CH_2\overset{OH}{\overset{|}{C}}HCH_3}{\underset{CH_2CHCH_3}{<}}$$

$$CH_2-\underset{O}{\overset{\|}{C}}-OCH-CH_2N\overset{CH_2CH_2}{\underset{CH_2CH_2}{<}}NCH_2CH_2N-CH_2CHCH_3 \quad \overset{|}{OH}$$

$$\underset{CH_2CHCH_3}{\overset{|}{O}H}$$

where R is a polyisobutene radical of an average molecular weight of 1,200, said concentrate blended in said composition FF to give it a 0.069 wt. percent N content.

(4) Composition GG consists of a paraffinic petroleum base lubricating oil of an SUS viscosity at 100° F. of 340 and 3.6 wt. percent (0.040 wt. percent in GG) of a polymeric dispersant concentrate primarily of the formula:

$$R-CH-\overset{O}{\overset{\|}{C}}-O-\overset{CH_3}{\overset{|}{C}H}CH_2N\overset{CH_2CH_2}{\underset{CH_2CH_2}{<}}N-CH_2CH_2N\overset{CH_2\overset{OH}{\overset{|}{C}}HCH_3}{\underset{CH_2CHCH_3}{<}}$$

where R is polyisobutylene of an average molecular weight of about 1200.

(5) Composition HH consists of paraffinic petroleum base oil of an SUS viscosity at 100° F. of 340 and 2.16 wt. percent (0.022 wt. percent N in HH) of a polyisobutene (1,200 M.W.) alkenyl succinic anhydride-piperazine dipropanol polymer concentrate of the type prepared in Example II having an average molecular wt. of about 8,000.

(6) Composition II consists of a paraffinic base petroleum lubricating oil of an SUS viscosity at 100° F. of 340 and 2.16 wt. percent (0.022 wt. percent N in II) of a product concentrate of a non-polymeric dispersant primarily of the formula:

$$R-CH-\overset{CH_3}{\overset{|}{C}}-O\overset{}{C}HCH_2N\overset{CH_2CH_2}{\underset{CH_2CH_2}{<}}NCH_2\overset{CH_3}{\overset{|}{C}}HOH$$

where R is polyisobutene of a molecular weight of about 1,200.

(7) Composition JJ consists of a paraffinic base petroleum lubricating oil of an SUS viscosity at 100° F. of 340 containing 3.6 wt. percent (0.054 wt. percent N in JJ) of a dispersant of a well known commercial type dispersant of the formula:

$$R-CH-\overset{O}{\overset{\|}{C}}-NH(CH_2CH_2NH)_4H$$
$$\overset{|}{CH_2COOH}$$

where R is a polyisobutene radical of an average molecular weight of about 1,200.

The results of the testing of the foregoing compositions in the aforedescribed sludge test is reported below in Table II. It is to be noted that in Table II the relative molar amount between the various compositions based on the polyisobutene (1,200 M.W.) succinic anhydride component of the additive are reported in order to more clearly establish the significance of the comparison.

TABLE II

| Compositions | Additive concentrate, weight percent | Relative molar amt. based on ASA [2] component | Sludge test sediment depth, mm. |
|---|---|---|---|
| DD | 2.2 | 1.21 | 1.1 |
| EE | 3.6 | 1.21 | 1.2 |
| FF [1] | 3.6 | 1.55 | 2.1 |
| GG [1] | 3.6 | 1.21 | 2.5 |
| HH | 2.0 | 1.00 | 1.0 |
| II [1] | 2.0 | 1.00 | 2.9 |
| JJ [1] | 3.6 | 1.00 | 2.3 |

[1] Comparative compositions.
[2] ASA = Alkenylated succinic acid anhydride moiety.

As can be seen from the foregoing, the example lubricant compositions of the invention (DD, EE and HH) are approximately twice as effective as analogous dispersant compositions (FF, GG, II) and a well known commercial composition (JJ).

EXAMPLE V

This example illustrates the dispersant properties of the lubricant compositions of the invention.

The test employed is the well known CLR light duty deposit engine test. The test comprises lubricating with the test oil composition, a single cylinder engine operated at an r.p.m. of 1,500 with alternating cooling jacket temperatures of 6 hours at 100° F. and 2 hours at 190° F.

The rocker arm area, push rod area, timing gear area, oil pan, crankcase and oil screen are periodically inspected for sludge and rated from 10 to 0, a rating of 10 representing a clean, no sludge rating and a rating of 0 representing heavy sludge.

The base oil employed is a typical 10W–30 type oil comprising paraffinic lubricating oil of an SUS viscosity at 100° F. of about 128 containing 1.2 wt. percent barium $C_{12}$ alkyl phenolate, 1 wt. percent barium sulfonate-barium carbonate complex, 0.7 wt. percent zinc isopropyl methyl isobutyl carbinyl dithiophosphate, 5 wt. percent of a mineral oil concentrate containing 25 wt. percent mixed methacrylate alkyl esters in which the alkyl groups range from butyl to stearyl, and 150 p.p.m. dimethyl silicone antifoam concentrate. To the base oil dispersant additive there is added concentrates of the types described in Compositions DD to JJ in Example II. The run designation in Table III below corresponds to the composition designation in Example II in respect to the dispersant additive concentrate. The test data and results are reported below in Table III:

TABLE III

| Run | Additive concentrate, wt. percent in test composition | Wt. percent N, test composition | Hours to 8 rating |
|---|---|---|---|
| DD | 2.2 | .026 | 125 |
| EE | 3.6 | .04 | 108 |
| FF [1] | 3.6 | .069 | 109 |
| GG [1] | 3.6 | .040 | 91 |
| HH | 2.16 | 0.022 | 130 |
| II [1] | 2.16 | 0.022 | 69 |
| JJ [1] | 3.6 | 0.054 | 92 |
| KK [2] | 0 | 0 | 19 |

[1] Comparative compositions.
[2] Base oil contains only the methacrylate and dithiophosphate ingredients.

As can be seen from the above table the compositions of the invention (DD, EE, HH) are for the most part significantly superior in dispersant in respect to the analogous comparative compositions (FF, GG, II, JJ, KK).

I claim:
1. A hydrocarbon lubricating oil composition containing between about 1 and 80 wt. percent of a polymeric alkenyl succinic anhydride-alkoxylated piperazine dispersant selected from the group consisting of

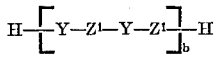

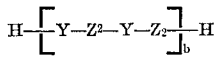

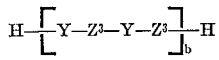

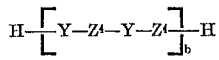

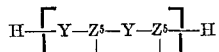

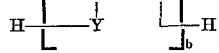

where

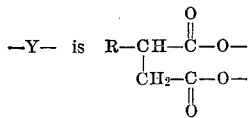

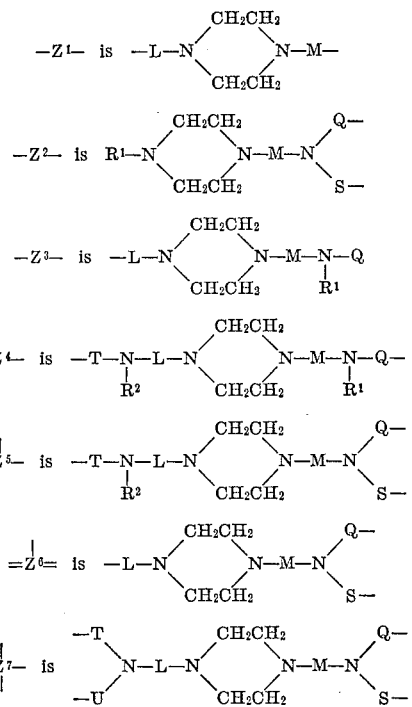

and where $b$ is an average integer between about 1 and 100, R is a monovalent alkenyl hydrocarbon radical of from 30 to 200 carbons, $R^1$ and $R^2$ are monovalent saturated aliphatic hydrocarbon radicals or monohydroxyalkyl radicals of about 1 to 10 carbons, and L, M, Q, S, T and U are divalent saturated aliphatic hydrocarbons of from 2 to 10 carbons.

2. A lubricating oil composition in accordance with claim 1 wherein said dispersant is

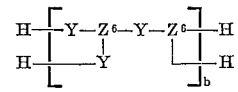

M is —$CH_2CH_2$—, L, Q and S are

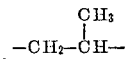

and R is polyisobutene of a molecular weight of about 1,200.

3. A composition in accordance with claim 1 wherein said dispersant is

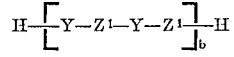

where $Z^1$ is

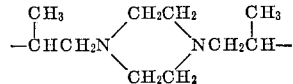

and R is polyisobutene of a molecular weight of about 1,200.

4. A composition in accordance with claim 1 wherein said dispersant is prepared by contacting under substantially anhydrous conditions an alkenyl succinic anhydride of the formula:

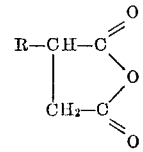

where R is as defined with an alkoxylated piperazine selected from the group consisting of

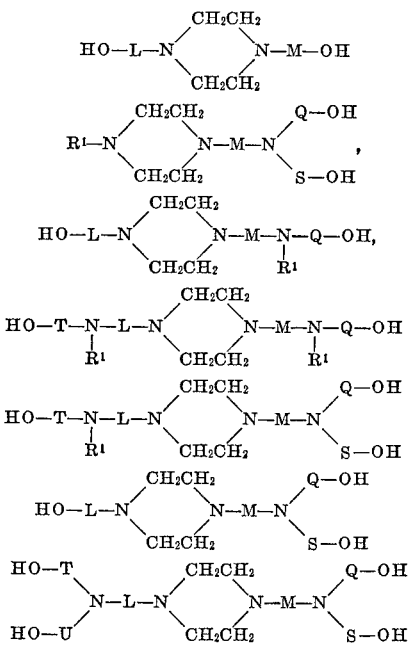

in an amount wherein the acyl to hydroxyl ratio in the initial reaction mixture is between about 1:1 and 1:2 at a temperature between about 80 and 220° C. and under conditions wherein water is continuously removed from the reaction mixture as formed.

5. A composition in accordance with claim 4 wherein said contacting is conducted in the presence of a hydrocarbon lubricating oil, the reaction mixture initially including liquid azeotroping agent for water.

6. A composition in accordance with claim 5 wherein said reaction mixture is continuously stripped during said contacting with inert gas and following said contacting said temperature is adjusted to between about 140 and 220° C. thereby removing any residual water and volatile material.

7. A composition in accordance with claim 6 wherein said R is a polyisobutylene radical of a molecular weight of about 1,200, said alkoxylated piperazine is tripropoxylated 2-aminoethyl piperazine characterized by the formula:

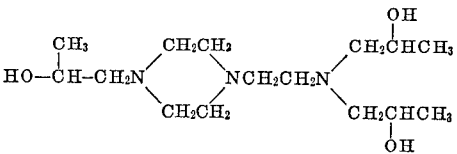

said azeotroping agent is toluene, said acyl to hydroxy ratio is about 1:1, and said dispersant is characterized by the formula:

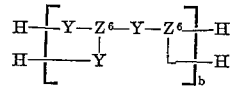

where M is —$CH_2CH_2$—, L, Q and S are

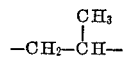

and R is a polyisobutene radical of about 1,200 molecular weight.

8. A composition in accordance with claim 6 wherein said alkoxylated piperazine is N,N'-di(2-hydroxypropyl) piperazine, said azeotroping agent is toluene, said acyl to hydroxyl ratio is about 1:1 and said dispersant is

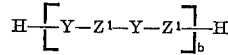

where L and M are

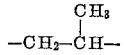

and R is a polyisobutene radical of about 1,200 molecular weight.

References Cited

UNITED STATES PATENTS

| | | | |
|---|---|---|---|
| 3,024,195 | 3/1962 | Drummond et al. | 252—51.5 |
| 3,219,666 | 11/1965 | Norman et al. | 252—51.5 XR |
| 3,311,558 | 3/1967 | Prizer et al. | 252—51.5 XR |
| 3,324,033 | 6/1967 | Knapp | 252—51.5 |

PATRICK P. GARVIN, *Primary Examiner.*

U.S. Cl. X.R.

260—268